United States Patent
Todd et al.

(10) Patent No.: US 10,552,470 B2
(45) Date of Patent: Feb. 4, 2020

(54) GLOBAL RECOMMENDATION SYSTEMS FOR OVERLAPPING MEDIA CATALOGS

(71) Applicant: NETFLIX, INC., Los Gatos, CA (US)

(72) Inventors: Michael Todd, Los Gatos, CA (US); Ehtsham Elahi, Los Gatos, CA (US); Aish Fenton, Los Gatos, CA (US); Carlos Gomez Uribe, Los Gatos, CA (US)

(73) Assignee: Netflix, Inc., Los Gatos, CA (US)

( * ) Notice: Subject to any disclaimer, the term of this patent is extended or adjusted under 35 U.S.C. 154(b) by 976 days.

(21) Appl. No.: 15/079,767

(22) Filed: Mar. 24, 2016

(65) Prior Publication Data

US 2016/0292158 A1 Oct. 6, 2016

Related U.S. Application Data

(60) Provisional application No. 62/143,629, filed on Apr. 6, 2015.

(51) Int. Cl.
*G06F 17/30* (2006.01)
*G06F 16/435* (2019.01)
(Continued)

(52) U.S. Cl.
CPC ...... *G06F 16/435* (2019.01); *G06F 16/24578* (2019.01); *G06F 16/285* (2019.01);
(Continued)

(58) Field of Classification Search
CPC .. G06F 16/435; G06F 16/285; G06F 16/9535; G06F 16/24578; H04L 65/4084; H04L 65/60; H04L 67/10; H04L 67/22
See application file for complete search history.

(56) References Cited

U.S. PATENT DOCUMENTS 8,666,980 B1 3/2014 Vora
9,712,587 B1 * 7/2017 Alfishawi .......... G06Q 30/0269
(Continued)

FOREIGN PATENT DOCUMENTS

EP 2717179 A1 4/2014

OTHER PUBLICATIONS

International Search Report and Written Opinion dated Jul. 7, 2016 in connection with International Application No. PCT/US2016/026070; 10 pp.

*Primary Examiner* — Apu M Mofiz
*Assistant Examiner* — Husam Turki Samara
(74) *Attorney, Agent, or Firm* — FisherBroyles, LLP

(57) ABSTRACT

A computer-implemented method and a system for implementation the method are provided. The method includes receiving user activity data for a first set of users of a streaming media system, in which the first set of users having access to a first catalog. Additional user activity data for a second set of users is received. The second set of users has access to a second catalog, which includes media items also present in the first catalog. The second catalog further includes an exclusive media item that is not included in the first catalog. A probability that a user of the first set of users would play the exclusive media item if presented by the streaming media system with the exclusive media item is determined. Information is provided to a user of the second set of users as a recommendation to play the exclusive media item based on the probability.

20 Claims, 9 Drawing Sheets

(51) Int. Cl.
*H04L 29/06* (2006.01)
*H04L 29/08* (2006.01)
*G06F 16/28* (2019.01)
*G06F 16/9535* (2019.01)
*G06F 16/2457* (2019.01)

(52) U.S. Cl.
CPC ...... *G06F 16/9535* (2019.01); *H04L 65/4084* (2013.01); *H04L 65/60* (2013.01); *H04L 67/10* (2013.01); *H04L 67/22* (2013.01)

(56) References Cited

U.S. PATENT DOCUMENTS

| | | | |
|---|---|---|---|
| 2009/0259621 | A1* | 10/2009 | Svendsen ................ G06F 16/48 |
| 2011/0176790 | A1* | 7/2011 | Morris ............ H04N 21/43615 |
| | | | 386/299 |
| 2013/0013458 | A1 | 1/2013 | Uribe et al. |
| 2014/0280221 | A1* | 9/2014 | Chuang ............ G06F 16/24578 |
| | | | 707/748 |
| 2015/0134653 | A1* | 5/2015 | Bayer ................ H04N 21/251 |
| | | | 707/732 |

* cited by examiner

First Media Item Catalog 500

| Item ID 502 | Title 504 | Duration 506 | Other Information 508 |
|---|---|---|---|
| 1533 | Fast and Ferocious I | 1:37:00 | Film Series |
| 4823 | Fast and Ferocious II | 2:05:36 | Film Series |
| 0707 | Seoul Music | 2:05:35 | Television Show |
| 5978 | Alien Secrets of WWII | 47:54 | Television Show |

FIG. 5A

Second Media Item Catalog 550

| Item ID 502 | Title 504 | Duration 506 | Other Information 508 |
|---|---|---|---|
| 1533 | Fast and Ferocious I | 1:37:00 | Film Series |
| 1903 | Silence of the Sheep | 2:05:36 | Feature Film |
| 0707 | Seoul Music | 2:05:36 | Television Show |
| 5978 | Alien Secrets of WWII | 47:54 | Television Show |

FIG. 5B

600 

| Users 602 | Cluster 604 |
|---|---|
| 1A2B | CL278 |
| 2X8F | CL278 |
| 3H8S | CL102 |
| 2Y3M | CL275 |

FIG. 6

700 

| Users 702 | Catalog 704 |
|---|---|
| 1A2B | C07 |
| 2X8F | C02 |
| 3H8S | C07 |
| 2Y3M | C09 |

|  |  | Media Items | | | | |
|---|---|---|---|---|---|---|
|  |  | 1533 | 4823 | 0707 | 1903 | 5978 |
| Users | 1A2B | (1,1) | (1,1) | (1,0) | (0,0) | (1,1) |
|  | 2X8F | (1,1) | (0,0) | (1,0) | (1,0) | (1,1) |
|  | 3H8S | (1,0) | (1,0) | (1,1) | (0,0) | (0,0) |
|  | 2Y3M | (1,1) | (1,1) | (0,0) | (0,0) | (1,0) |

|  |  | Media Items | | | | |
|---|---|---|---|---|---|---|
|  |  | 1533 | 4823 | 0707 | 1903 | 5978 |
| Users | 1A2B | (1,1) | (1,1) | (1,0) | (1,1)* | (1,1) |
|  | 2X8F | (1,1) | (1,1)* | (1,0) | (1,0) | (1,1) |
|  | 3H8S | (1,0) | (1,0) | (1,1) | (1,0)* | (0,0) |
|  | 2Y3M | (1,1) | (1,1) | (0,0) | (1,0)* | (1,0) |

FIG. 8B

GLOBAL RECOMMENDATION SYSTEMS FOR OVERLAPPING MEDIA CATALOGS

TECHNICAL FIELD

The present disclosure relates generally the distribution of media items including audio and video over a network to a large collection of users who may be permitted to access different media item catalogs.

BACKGROUND

While consumers may access media items, such as movies and television shows, by receiving over the air signals by subscribing to a cable or satellite television provider, increasingly consumers are accessing more and more content over Internet-based systems. Some Internet-based systems allow users to stream content over the Internet to a variety of client devices. For example, a streaming media system may provide content to users via a personal computer, a set-top box, or a personal mobile device, such as a smart phone or tablet computer. Streaming media systems enable users to access media content in a stream, such that the users may begin consuming (e.g., watching and/or listening to) content before the entirety of the content is delivered to the user's client device. Such a system allows users to access content while avoiding a potentially lengthy download process.

In order to provide users with satisfying content, operators of a streaming media system may license content and/or develop high-quality original content for its users to consume. This may entail the creation of a substantial library or catalog of content. A user may access individual media items in the catalog through a process of search and/or by a process of recommendation controlled by the system operator. By helping users to find content that correlates well with the users' personal preferences through searches and/or recommendations, the operator of the streaming media system provides value to its users.

However, problems can arise as the operator of the streaming media system includes more and more content and includes multiple libraries or catalogs that correspond with media licenses having jurisdictional limitations. The express and inferred preferences of users in smaller jurisdictions can be drowned out by the preferences of users in larger jurisdictions. This may happen, in part, when recommendations are based on user activity data such as reviewing history. Accordingly, the process of providing users with recommendations is not satisfactory in all respects.

BRIEF DESCRIPTION OF THE DRAWINGS

FIG. 5A is a diagram illustrating a first media item catalog according to some embodiments of the present disclosure.

FIG. 5B is a diagram illustrating a second media item catalog according to some embodiments of the present disclosure.

FIG. 6 is a diagram of a database linking users of the streaming media system to a media item catalog according to some embodiments of the present disclosure.

FIG. 7 is a diagram of a database associating users of the streaming media system to one or more clusters identified in the streaming will media system according to some embodiments of the present disclosure.

FIG. 8A is a diagram illustrating a matrix of user activity data according to some embodiments of the present disclosure.

FIG. 8B is a diagram illustrating a matrix of user activity including generated play records according to some embodiments of the present disclosure.

Figure 1:
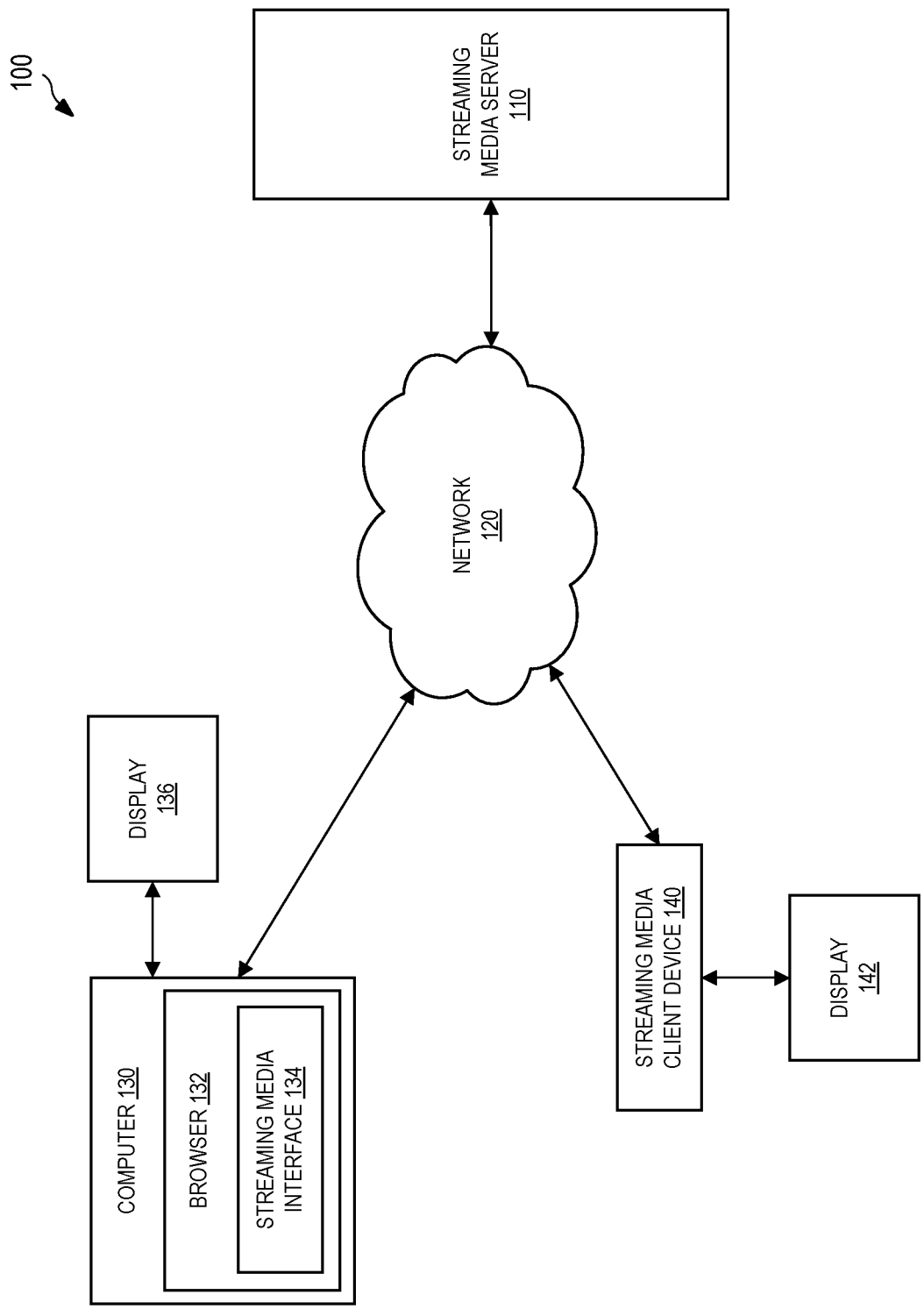
FIG. 1 is a block diagram of a streaming media system that allows users to access streaming media items according to some embodiments of the present disclosure.

These drawings will be better understood by those of ordinary skill in the art by reference to the following detailed description.

DETAILED DESCRIPTION

With references to the drawings briefly described above, exemplary applications of systems and methods according to the present disclosure are described in this section. These examples are provided to add context and aid in the understanding of the invention. It will thus be apparent to one skilled in the art that the present invention may be practiced without some or all of these specific details. In other instances, well-known process steps have not been described in detail in order to avoid unnecessarily obscuring the present disclosure. Additionally, other applications of the concepts and principles described herein are possible, such that the following examples should not be taken as limiting. For example, while many of the examples disclosed herein are directed to streaming media, the principles and concepts described may be applied to provide recommendations in a system that additionally or alternatively provides media items for consumption in other manners, such as purchase, rental, download, etc.

In the following detailed description, references are made to the accompanying drawings, which form a part of the description and in which are shown, by way of illustration, specific embodiments of the present disclosure. Although these embodiments are described in sufficient detail to enable one skilled in the art to practice the invention, it is understood that these examples are not limiting, such that other embodiments may be used, and changes may be made without departing from the spirit and scope of the invention.

Devices, systems and methods are provided for performing activities related to the provision of recommendations to users of streaming media systems. In various particular embodiments, the devices, systems or methods involve one or more devices in communication over a network to provide users with streaming media items for consumption (e.g., to watch and/or to listen to).

Some recommendation systems may rely exclusively on user activity data such as a history of previously consumed media items in making recommendations of new media items for users consume or for previously consumed media items to be consumed again. In order to satisfy customers, it would be ideal to provide optimal recommendations for each user. However providing such recommendations is complicated by a variety of factors. For example, when a first media item is presented (for example, as a recommended media item in a user interface) to a large number of users, a significant portion of those users may select the media item based on the recommendation. This results in additional play records being included in user activity data. To the extent that these additional play records are added into a data set operated on by a recommendation engine, a feedback loop may be created. Because of this feedback loop, the first media item may be recommended substantially more than its intrinsic merit or actual approval of users would indicate. The feedback loop presents a problem that is specifically arises due to the use of the recommendation engine. To the extent that recommendations of the first media item displace recommendations of a second media item (e.g., by moving the second media item further down a list of recommendations presented to one or more users or removing it from recommendations entirely) that users would have enjoyed more, users may be less satisfied with the streaming media system. In other words, the feedback loop can artificially promote an intrinsically less popular media item over an intrinsically more popular media item.

Additionally, a similar but distinct problem may arise in the context of overlapping media item catalogs to which different users or groups of user have access. This distinct problem, described below, also results naturally from the peculiarities of an Internet-based media system, which can technologically provide any media item stored in one jurisdiction to users in any other jurisdiction. In some embodiments, a streaming media system operator may provide content to users is through the licensing-in of content from a copyright holder. When content such as movies, television shows, live events, etc., are licensed in by a streaming media system operator, the license may have a specified, limited geographic, political, or jurisdictional scope, such as a country, a subdivision within a country, or an organized region, such as an economic cooperation zone that includes multiple countries. For example, an owner of the copyrights to a movie may choose to license that movie to a first streaming media system operator in a first country without granting that streaming media system operator rights to stream that movie to users in a second country. If the streaming media system operator provides streaming media services within both the first and second countries, the streaming media system may provide a first media item catalog that includes the movie to users within the first country and the second media item catalog that does not include the movie to users in the second country. While in some embodiments, overlapping media item catalogs may be present when a pay-wall or tiered subscription fees are used to provide a portion or quantity of content to subscribers paying a first rate (which may be zero), while providing exclusive content to subscribers paying a higher rate. The different legal jurisdictions or geographic jurisdictions described herein may not be based on a pay-wall, although the solutions present herein may provide improved recommendations where a pay-wall is used to provide separate, but overlapping media item catalogs to users.

Because the populations and Internet infrastructure of countries and regions throughout the world can vary significantly, the number of users of the streaming media system can also vary significantly. For example, the streaming media system operator may have a first media item catalog available to users within the United States and a second media item catalog available to users in New Zealand. Both of these countries may have adequate infrastructure; however, the population of the United States is approximately 320 million, while the population of New Zealand is about 4½ million. While these populations do not necessarily reflect the number of users of a streaming media system, they provide the pool from which users in these two jurisdictions are drawn.

When recommendations are based on the play rate or play count of each media item, a media item that is available in New Zealand but not in the United States will be unlikely to appear in a recommendation simply because the limited population of users in New Zealand limits the play counts of even popular media items in comparison with play counts of comparably popular media items available to users in the United States. If recommendations to users in New Zealand include play counts associated with the selections of users in the United States, media items that are exclusive to the New Zealand media item catalog are unlikely to be recommended to any substantial number of users.

One approach to providing recommendations to users in different jurisdictions who access distinct media item catalogs is to base recommendations for users associated with one catalog only on user activity data derived from users with access to that catalog. In this way, a relatively large number of play counts in one jurisdiction will not affect recommendations derived from play counts within another jurisdiction.

Another approach to providing recommendations to users in jurisdictions is to base recommendations for users on a "take-rate" basis, in which information regarding presentations or recommendations of media items are taken into consideration. For example, recommendations may be generated by a model-driven recommendation or presentation engine based on whether a particular media item is selected or played by a user when that particular media item is presented to the user. Thus the recommendations may be generated based on at least two pieces of information for each media item including an indication of whether or not a particular media item has been recommended to a user and whether or not that user has selected the particular media item to be played. These two pieces of information can be combined to provide a ternary piece of information. On the "take-rate" or "presentation" basis, for each media item in a given media item catalog, each user has either: (1) been recommended the media item and played the media item, (2) been recommended the media item and not played the media item, or (3) not been recommended the media item and not played the media item. In some embodiments, information indicating that the media item has not been recommended and has been played may be used in modeling recommendations as well.

By using this take-rate information accessible in the user activity data, recommendations may account for both the presentation bias introduced by the recommendations themselves, and for the presentation bias introduced by the presence of separate but overlapping media item catalogs. For example, if the number of recommendations for a particular media item increases the number of plays of the particular media item does not increase proportionately, a recommendation may use the take-rate information and determine to recommend that particular media item less frequently or lower in a ranking of recommendations going forward. As another example, when the take-rate information is used in providing recommendations to New Zealanders (or to another set of users in a smaller jurisdiction) the fact that New-Zealand-exclusive media items are not presented to as many users as are media items that are common to both the New Zealand and United States media item catalogs may enable exclusive media items to be recommended to New Zealand-based users according to their popularity among users within New Zealand.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these words are not necessarily all referring to the same embodiment. Furthermore, the particular features, structures or characteristics may be combined in any suitable manner in one or more embodiments.

Referring now to FIG. 1, shown therein is a block diagram of a streaming media system 100 that allows users to access streaming media items. The streaming media system 100 includes a streaming media server 110 that is illustrated in communication with multiple client devices over a network 120. The streaming media server 110 may comprise or implement a plurality of servers and/or software components that operate to perform various operations in accordance with the described embodiments. Exemplary servers may include, for example, stand-alone and enterprise-class servers operating a server operating system (OS) such as a MICROSOFT® OS, a UNIX® OS, a LINUX® OS, or another suitable server-based operating system. It can be appreciated that the server 110 illustrated in FIG. 1 may be deployed in other ways and that the operations performed and/or the services provided by such servers may be combined or separated for a given implementation and may be performed by a greater number or fewer number of individual server devices. One or more servers may be operated and/or maintained by the same or different entities. As illustrated, the server 110 is operated by a streaming media service provider, also referred to herein as a streaming media system operator.

Data and/or voice communications between the client devices and the streaming media server may be sent over the network 120 which may include one or more networks such as the Internet, a WAN, a WWAN, a WLAN, a mobile telephone network, a landline telephone network, a VoIP network, as well as other suitable networks.

The media streaming system may further include a streaming media interface 134 operating on computer 130. The computer 130 may comprise or employ one or more client devices, such as a personal computer, a laptop, a mobile-computing device, such as tablet computer or a smartphone, a wearable computing device, and/or any other computing device having computing and/or communications capabilities in accordance with the described embodiments. The computer 130 includes a processing device and data storage device or memory and is able to execute instructions corresponding to system programs and application programs to perform various computing and/or communications operations. Exemplary system programs may include, without limitation, an operating system (e.g., iOS®, Android® OS, LINUX® OS, Firefox OS™, Windows®, OS X®, Binary Run-time Environment for Wireless (BREW) OS, JavaOS, a Wireless Application Protocol (WAP) OS, and others), device drivers, programming tools, utility programs, software libraries, application programming interfaces (APIs), and so forth. As shown in FIG. 1, the computer 130 executes software to provide a browser 132. The browser 132 may be a web browsing program such as Internet Explorer®, Chrome®, etc., and in turn, the browser 132 may support a streaming media interface 134 provided by the streaming media system operator. In some embodiments, the streaming media interface 134 may be a separate application executed independently of the browser 132. When executing the browser 132 and/or the streaming media interface 134, the computer 130 renders information for presentation in a display 136. In various embodiments, the display 136 may be integrated with the housing of the computer 130 or may be physically separate therefrom but coupled thereto by a wired and/or a wireless communication link.

The streaming media system 100 further includes a streaming media client device 140 coupled to a display 142. For example, the streaming media client device 140 may be a set top box designed and configured to communicate directly with a display 142. For example, the streaming media client device 140 may be an Apple TV® device or a streaming media player made by Roku, Inc. of Saratoga, Calif. In some embodiments, the streaming media client device 140 may be integrated with the display 142 in a "smart" television. In operation, the streaming media system 100 permits the streaming media server 110 to receive requests for content from users operating the computer 130 and/or the streaming media client device 140 over the network 120 and to provide streaming media items over the network 120 in response. The information received from the streaming media server is rendered to the displays 136 and/or 142 in one or more graphical user interfaces.

Figure 2:
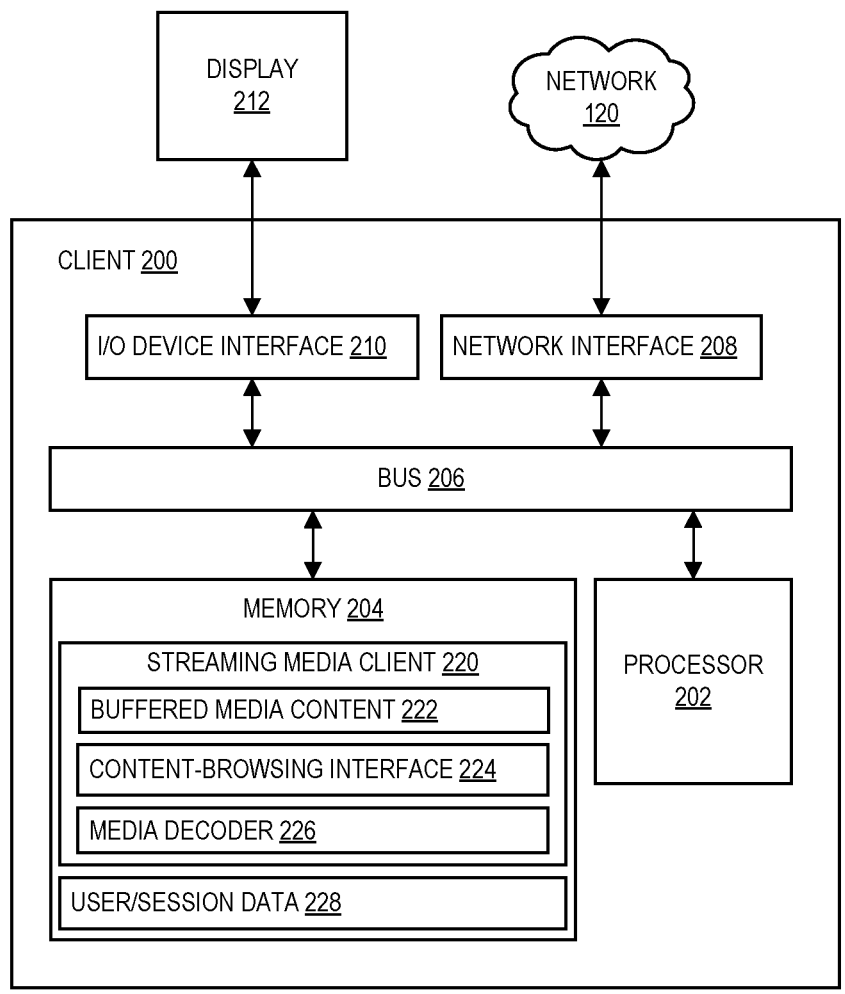
FIG. 2 is a block diagram of a client device that may be used as part of the streaming media system of FIG. 1 according to some embodiments of the present disclosure.

Referring now to FIG. 2, shown therein is an exemplary embodiment of the computer 130 and/or the streaming media device 140, represented as the client device 200. The client device 200 includes a processor 202 in communication with a data storage device or memory 204 over a bus 206. The bus further couples a network interface device 208 and an I/O device interface 210. The network interface device 208 may be a network interface card or network interface controller (NIC) that permits the client device 200 to communicate with the network 120. The I/O device interface 210 enables the client to communicate information to be rendered to the display 212 to display streaming media items and/or graphical user interfaces associated therewith. The I/O device interface 210 may further communicate with I/O devices such as infra-red or radio-frequency remote controls, keyboards, mice, touchscreens, etc. The processor 202 may execute software and/or other instructions stored in the memory 204. The memory 204 may be a collection of memories of different types that are included in a housing of the client device 200 or coupled to the client device 200 and in communication therewith. For example, the memory 204 may include cache memory, RAM, ROM, a solid-state hard drive, a disk-based hard drive, and/or other memory devices. The features depicted as stored on the memory 204 may be stored on and/or accessed from any combination of these different types of memories.

As illustrated in FIG. 2, the memory 204 includes a streaming media client 220, which may be a program executed by the processor 202 to provide a streaming media client configured to communicate with the streaming media server 110 of FIG. 1. The streaming media client 220 may have associated information stored in the memory 204. This is associated information may include offered media content 222, the content browsing interface 224, and a media decoder 226. These associated modules or components enable the streaming media client 220 to provide a graphical user interface by which a user may receive recommendations and make selections of media items to play. As a media item is received by the client device 200, the data representing a portion of the media item may be stored temporarily in a buffer. After the buffer contains sufficient data to provide for continuous streaming, the content may be rendered by the media decoder 226. The memory 204 further includes a user/session data 228 that may include information regarding interactions between the user of the client device 200 and the streaming media server 110 of FIG. 1. For example, the user/session data 228 may include user activity data regarding selections made by the user and/or presentations to the user made by the streaming media server 110. Additionally, the user/session data 228 may include information regarding the transmissions between the client device 200 and the streaming media server 110 including an average throughput and/or a peak throughput. Further, the user session data 228 may include information specifying an average bit rate associated with the streams that deliver the media items. In this way, an appropriate bit rate stream may be selected for subsequent portions of a media item or when a user selects a new media item to play.

Figure 3:
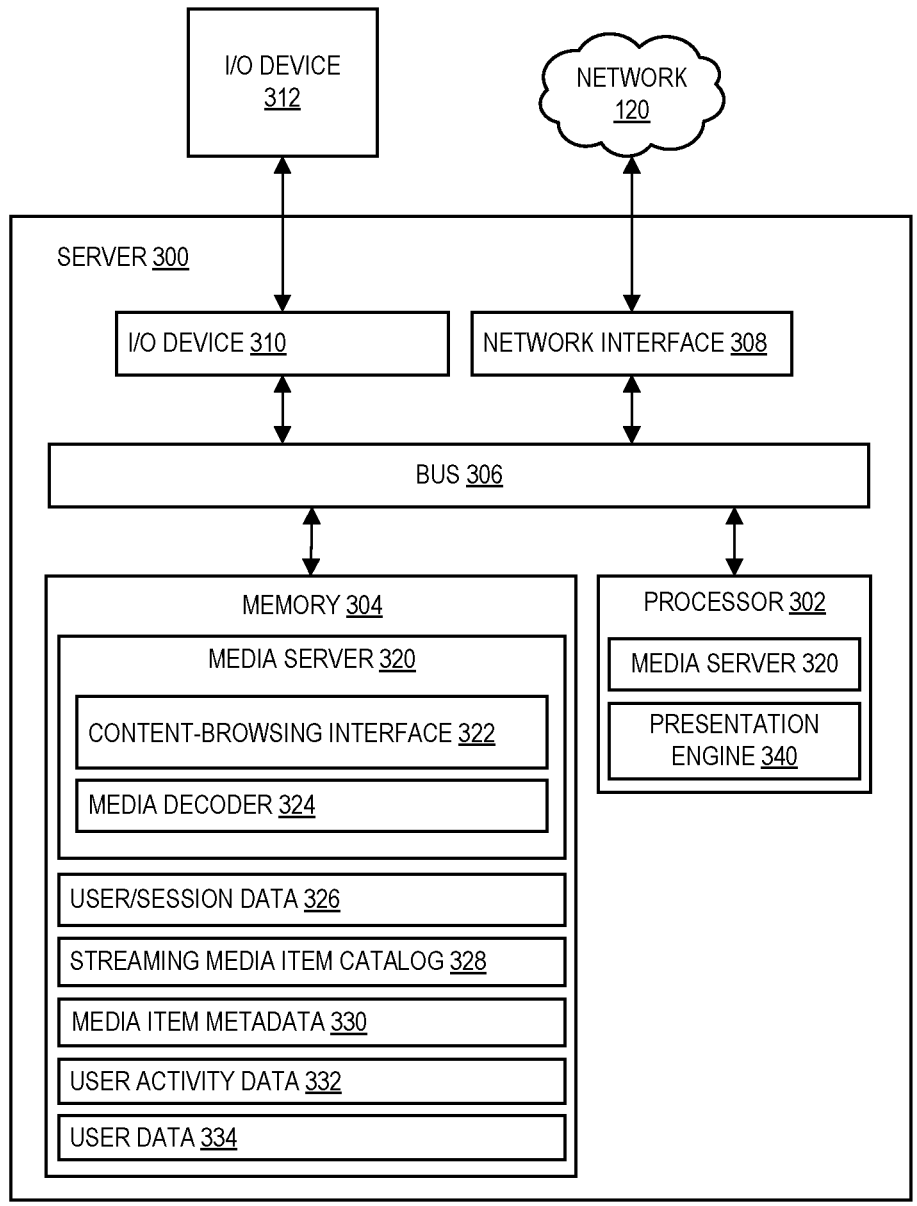
FIG. 3 is a block diagram of a server device that may be used in the streaming media system of FIG. 1 according to some embodiments of the present disclosure.

Referring now to FIG. 3, shown therein is a server 300 which may provide the server 110 of FIG. 1 as described herein. The streaming media server 300 is illustrated according to some embodiments of the present disclosure. As illustrated, the server 300 includes a processing device or processor 302, such as a central processing unit (CPU), a microcontroller, etc. The processor 302 is in communication with a memory 304 over a bus 306. The bus further connects the processor 302 to a network interface 308 and an I/O device interface 310. As described above in connection with client device 200 of FIG. 2, the network interface 308 may be a network interface card or a network interface controller (NIC) that enables the server 300 to communicate over a network 120 with multiple devices, such as client devices and other servers and/or media storage devices. The I/O device interface 310 couples the server 300 to one or more I/O devices such as the I/O device 312. The I/O device 312 may be a display, a keyboard, a mouse, a touchscreen, etc.

The processor 302 retrieves and executes programming instructions stored in the data storage device or memory 304 and may further access data stored therein when executing programming instructions to provide operations as described herein. While the memory 304 is illustrated as a single memory 304, the memory 304 may be a collection of memory types and devices. For example, the memory 304 may include cache memory, RAM, ROM, solid-state devices, magnetic disk-based storage devices, etc. In some embodiments, the memory 304 may further include networked-based storage, including a storage area network (SAN). For example, the information that is provided to users as a streamed media item may be stored in memory that is not housed within the housing of the server 300.

When the media item is selected by a user, the server 300 may access the media item wherever it is stored in memory in order to provide the media item to the user through the network interface 308 over the network 120. This may be done by the media server 320 which, as illustrated is stored in memory 304 and executed by the processor 302. The media server 320 includes instructions for providing a content browsing interface 322 and a media decoder 324, which may be used to decode and/or encode media items as they are received from storage and provided to a user over the network 120.

The memory 304 further includes a user/session data 326, which may be a set of information associated with a user's current session. For example, the user/session data 326 may include a bit rate that characterizes the connection with the user's client device to enable the appropriate selection of audio/video data to be sent to the user. Different portions of the information associated with the user/session data 326 may be moved to other databases during or after a session. The streaming media item catalog 328 may be stored in the memory 304 and may constitute a media item catalog or a plurality of media item catalogs accessible to one or more users of a streaming media system. Each of the media items represented in the media item catalog 328 may be accessible in a plurality of bit rates. An appropriate bit rate stream of the media item may be selected by the server 300 or the client device 200 when the media item is selected by the user. Associated media item metadata 330 may be stored on the memory 304 in connection with the streaming media items 328. The metadata 330 may include information about the media items, such as titles, durations, genres, play counts (by user, by jurisdiction, or in total), indications of whether or not the media items have been presented to a particular user, etc. Alternatively, the streaming media item catalog 328 may include the metadata 330 describing the actual media files, which may be made available from a content distribution network. In such a case, the media server 320 may be configured to generate a permission used by a client to obtain a given streaming media item from the content distribution network and to direct a client to the streaming media item wherever it is to be accessed. In some embodiments, the content distribution network is operated by a party that is not the operator of the streaming media system. Thus, in some embodiments, the content distribution network is a third-party system.

User activity data 332 is representative of one or more log files and/or databases in which user/session data is stored, including data relating to activities undertaken by users. Such activities may include, e.g., selecting a media item, playing a media item, performing a search, selecting a recommended media item, searching for a media item, and the like. Thus, user activity data 332 may include, e.g.: a user identifier (ID), media item IDs of media items presented to the user as recommendations, media item IDs of media items selected or played by the user, timestamps of when the item was recommended and/or selected, of pauses (intentional or unintentional) that occurred during play, of when selected items end playing. The user activity data 332 may also include information describing or characterizing which catalog of a plurality of catalogs each user may access and/or a media item cluster or clusters with which a user is associated in some degree. Clusters of users and/or clusters of videos may be identified by the media server 300 from user activity data 332. The clusters of users may indicate sets of users having similar preferences; while the clusters of videos may indicate sets of videos that are related to each other in some fashion. For example, the clusters of videos may be thematically related such as action movies, or true crime television shows, etc. in some embodiments, the clusters of videos may be related in ways that are not thematic, such as videos related by actor, by producer, by year, by geography or jurisdiction, etc.

The memory 304 further stores user data 334, which may also include user IDs of each user subscribing to the streaming media system or otherwise having access thereto, and may further include usernames, password data, and other user information, such as profile information. In some embodiments multiple profiles may be associated with a single user ID. For example, a user ID may be used by all the members in a household, while some subsets of the members of the household may have different profiles. For example, a user ID may be associated with a children's profile and an adults' profile.

As discussed in greater detail below, the user activity data 332, media item metadata 330, and user data 334 may be used to identify causal and non-causal relationships between activities of various users and particular media items or clusters thereof and relationships between the various users and a streaming media system itself. For example, the user activity data 332, media item metadata 330, and user data 334 may be used to determine the likelihood or probability that a user or cluster of users will select a particular media item when that particular media item is presented to the user or cluster of users. This probability and other information may be used to recommend media items to users of the streaming media system that compensate for the presentation bias that can occur as a result of recommendations by the streaming media system and for the presentation bias that can occur as a result of different but overlapping media item catalogs, such as (but not limited to) media item catalogs in different jurisdictions. In other embodiments, the overlapping but distinct media item catalogs may result from a pay-wall (for purchases or rentals of media items) or tiered subscription fees, etc.

Figure 4:
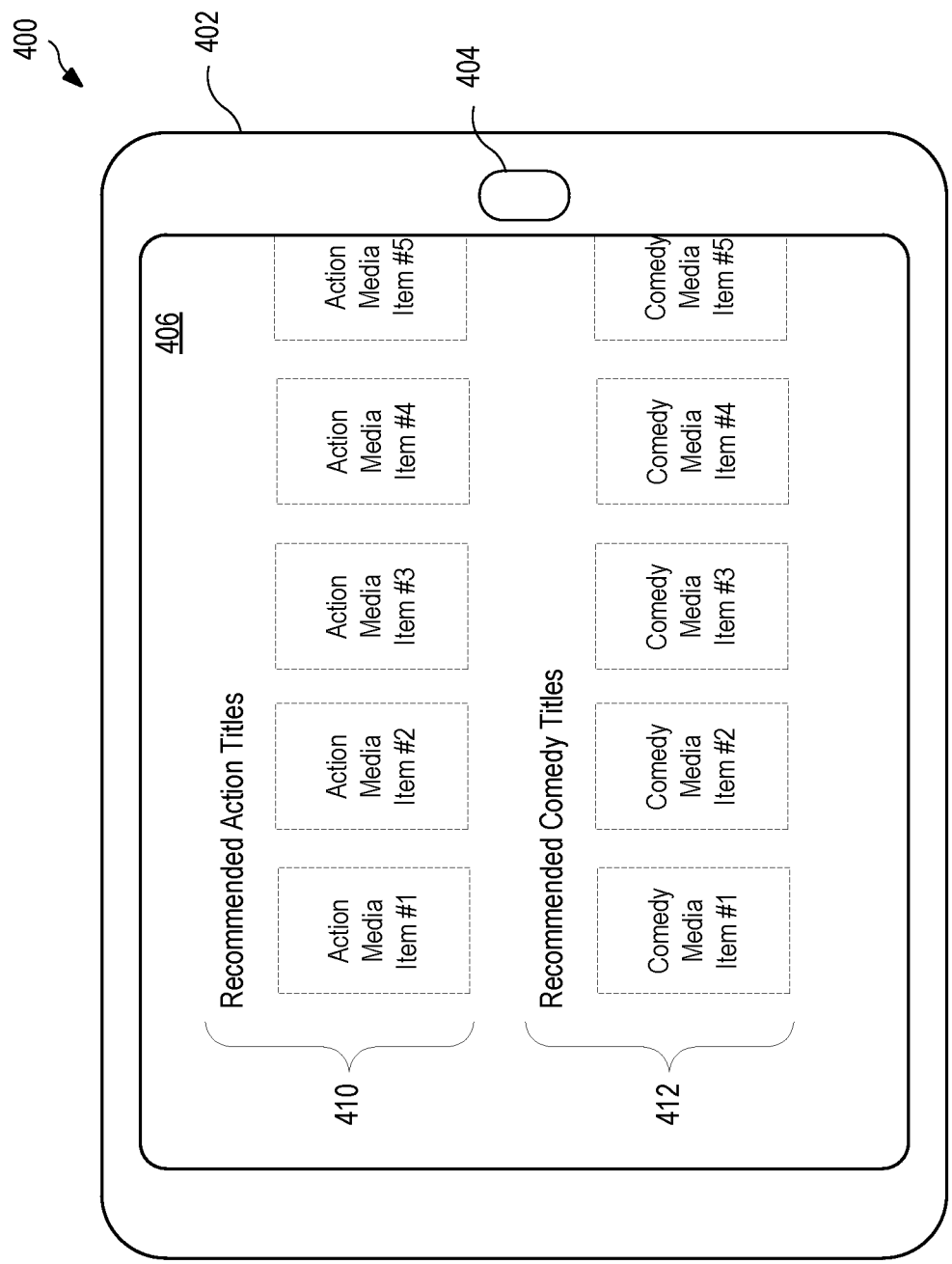
FIG. 4 is an exemplary user interface is presented in a personal mobile client device according to some embodiments of the present disclosure.

The server 300 further includes a recommendation or presentation engine 340, which determines which media items from the media item catalog 328 should be recommended or presented to a particular user in a user interface. For example, the presentation engine 340 may determine that, when a certain user accesses the media streaming system using a client device 400, illustrated as a tablet computer in FIG. 4, the user should be presented with a user interface 406 rendered to a touchscreen 402 of the device 400. The device 400 may further include one or more hardware or software buttons 404. The user interface 406 is provided by an application or interface provided by the streaming media system operator. As illustrated, a portion of a cluster 410 of media items is included in the user interface 406. The cluster 410 includes media items that have been categorized as "action" movies or television shows or that have been identified as popular among users that share common viewing interests as indicated by their user activity data.

The cluster 410 displays or presents five "action" media items. The user may select any of these media items or may view additional media items in the cluster 410 by interacting with the user interface 406, for example by scrolling or swiping on the touchscreen 402. The cluster 412 displays or presents five "comedy" media items. When an icon or image representing a media item is displayed on the touchscreen 402, the user activity data associated with the user may indicate that the media item has been presented to the user. Thus, by scrolling to the right, the user may be presented with other media items. When the user selects on one of the items presented in the user interface 406, the user activity data associated with the user may further reflect that the user selected on it. For example, after touching the image associated with "Action Media Item #2", the user's activity data may reflect that the media item presented to the user as "Action Media Item #2" has been presented to the user and has been selected by the user. In some embodiments, a media item may be considered to have been selected by the user only after a certain threshold duration or threshold proportion of the media item has been played on the touchscreen 402. The media items presented in the clusters 410 and 412 may be displayed in the order accordingly to a probability that the particular user will play the media item when presented with it.

Referring now to FIGS. 5A and 5B, shown therein are the first exemplary media item catalog 500 and a second exemplary media item catalog 550, respectively. The media item catalogs 500 and 550 may be stored in memory, like the memory 304 of the server 300 illustrated in FIG. 3. The catalogs 500 and 550 may be databases including various fields that characterize a plurality of media items included in each catalog. As described herein the streaming media system may include multiple media item catalogs. For example, the first media item catalog 500 may be associated with a first jurisdiction such as the country of Switzerland (population: 8.1 million); while the second media item catalog 550 may be associated with a second jurisdiction such as Indonesia (population: 250 million).

In the depicted embodiments shown in FIGS. 5A and 5B, the media item catalogs 500 and 550 include a plurality of fields including a media item ID field 502 which lists all of the media items included in each catalog. As illustrated in FIGS. 5A and 5B, the media item IDs are numeric values; while in other embodiments an alphanumeric string or other suitable string or identifier may be used as media item IDs. The catalogs 500 and 550 further include a title field 504 that includes a title associated with each media item. Catalogs 500 and 550 also include a duration field 506 and an "other information" field 508. The duration field 506 includes a duration of each media item in hours, minutes, and seconds, for example. As illustrated in FIGS. 5A and 5B, the other information field 508 includes an indication of a type of each media item. For example, the media items included in the first media item catalog 500 includes at least two film series type media items, and two television show type media items. The second media item catalog 550 includes at least a film series type media item, a feature film type media item and multiple television show type media items.

As is observed in FIGS. 5A and 5B, the catalogs 500 and 550 both include media items 1533, 0707, and 5978. Additionally, both of the catalogs 500 and 550 include a media item that is not included in the other catalog. For example, the catalog 500 includes media item 4823, entitled "Fast and Ferocious II" that is not included in the catalog 550. The media item 4823 may be referred to as an exclusive media item in that it is exclusive to the catalog 500 with respect to the catalogs 500 and 550. The second media item catalog 550 includes an exclusive media item 1903, entitled "Silence of the Sheep," which is not included in the first media item catalog 500.

User activity data for a set of users (e.g., Swiss subscribers) with access to the first media item catalog 500 may include significantly less in terms of data volume then user activity data for a set of users (e.g., Indonesian subscribers) with access to the second media item catalog 550. Accordingly, the proportion of play counts attributable to Indonesian subscribers may be significantly greater than the proportion of play counts attributable to the Swiss subscribers. If only the play count were to be relied upon in providing recommendations to the Indonesian subscribers and the Swiss subscribers, it would be unlikely that any exclusive media items present in the first media item catalog 500 would be presented to the Swiss subscribers as recommendations. For example, while more than 90% of Swiss users who played "Fast and Ferocious I" also watched "Fast and Ferocious II", because "Fast and Ferocious II" is not included in the second media item catalog 550, Swiss users may be presented with "Silence of the Sheep" as a recommendation rather than "Fast and Ferocious II." A recommendation or presentation engine using only play count data may be more likely to recommend "Silence of the Sheep" to Swiss users even though those users or a cluster within Swiss users, if offered "Fast and Ferocious II," would be more likely to watch "Fast and Ferocious II" than "Silence of the Sheep."

When the presentation engine 340 of the server 300 of FIG. 3 receives take-rate data, as an input, and thus considers whether a user was presented with a media item in addition to whether the user selected the media item, as an input the presentation engine 340 will be more likely to recommend "Fast and Ferocious II" to the Swiss users, to the extent that "Fast and Ferocious II" has a take-rate that is high compared with other media items in the first media item catalog 500. For example, the presentation engine 340 may be configured to recommend a media item when the media item has a take-rate above a specific threshold within a country. In some embodiments, the presentation engine 340 may be further configured to recommend a media item to a particular user when that media item has a high take-rate with respect to a cluster of users with which the particular user is associated. For example, if "Alien Secret of WWII" has a high take-rate among a particular cluster of Swiss users, the presentation engine 340 may recommend "Alien Secret of WWII" to a particular cluster of Indonesian users that is similar to the cluster of Swiss users. In some embodiments, clusters of users may not be artificially limited to any jurisdiction. Accordingly, some media items with a high take-rate among a cluster of users may not be available to a subset of the cluster if that subset resides in a jurisdiction that does not have access to a media item catalog including those media items.

For example, the user-cluster table 600 of FIG. 6 represents data derived from user activity data 332 that associates users with one or more identified clusters. As shown in the user-cluster table 600, each user listed in a user field 602 is associated with at least one cluster in the cluster field 604. Additional cluster fields may be present in embodiments in which the user is associated with more than one cluster. In some embodiments, the association between a user and a cluster of a set of user-associated clusters may be represented as a probability, such that the combined probabilities associating the user with the clusters sums to one.

Referring now to FIG. 7, shown there in is a user-catalog table 700 which represents data associating each of the users of the streaming media system with a particular streaming media item catalog. As illustrated in FIG. 7, the user-catalog table 700 includes a user field 702 including user identifiers or user IDs which are associated with a catalogue identifier or catalog ID in the catalog field 704. As shown in the user-catalog table 700, the users 1A2B and 3H8S both have access to catalog C07, which is the catalog illustrated as the first media item catalog 500 of FIG. 5A. The user 2X8F has access to catalog C02, which is the catalog illustrated as the second media item catalog 550 of FIG. 5B. The user 2Y3M has access to a catalog C09. In some embodiments of the user-catalog table 700, rather than identify a catalog in the catalog field, the table 700 may identify a catalog mask that filters out any media items in an intra-jurisdictional media item catalog. In some embodiments, the user may have a personalized catalog mask that is associated only with the user. In other embodiments, the user may have a catalog mask that is shared among a plurality of users, such as all of the users in a particular jurisdiction. The information contained in the user-catalog table 700 may be referred to herein as user access data, in that it describes what items may be accessed by a particular user. In some embodiments, this user access data is included as a separable portion or component of the user activity data.

Referring now to FIGS. 8A and 8B, shown therein are matrices 800 and 850, respectively, of user activity data. The matrix 800 includes rows associated with each user of the streaming media system and columns associated with each media item included in any catalog of the streaming media system. The information contained in the matrix 800 may be consolidated information that is consolidated from a set of user activity data associated with users having access to a first media item catalog and a set of user activity data associated with users having access to a second media item catalog. The media item catalogs include overlapping content that is available to both sets of users as well as exclusive content that is exclusive to one or the other set of users. As shown in FIG. 8A, data corresponding to four users is present but in practice thousands to millions or more of users may be included in the matrix 800. For each media item and for each user, the matrix 800 includes data describing whether or not the media item has been presented to the user and whether or not the media item has been selected by the user for play.

As illustrated, the information stored at the index $m_{1,1}$ of the matrix 800 is (1,1), indicating that the user 1A2B has been presented the media item 1533 and that the user 1A2B has selected the media item 1533 for play. The information stored at the index $m_{3,2}$ of the matrix 800 indicates that the user 3H8S has been presented with the media item 4823 and that the media item 4823 was not selected by the user 3H8S for play. Additionally, the information stored at the index $m_{2,2}$ of the matrix 800 indicates that the user 2X8F has not been presented with the media item 4823 and that the user 2X8F has not selected the media item 4823 for play. There may be multiple reasons why the media item 4823 has not been presented to the user 2X8F. For example, as indicated by the user-catalog table 700 of FIG. 7, the user 2X8F is able to access catalog C02, which corresponds to the second media item catalog 550 of FIG. 5B. As may be observed from FIG. 5B, the media item catalog 550 does not include the media item 4823. In other circumstances, a media item may not be presented to a particular user because the presentation engine 340 has determined that the media item 4823 has not merited a sufficiently high recommendation with respect to the user 2X8F, and so the media item 4823 has not been presented to the user 2X8F at the time reflected in the user activity data illustrated in matrix 800.

Some embodiments of the matrix 800 may include a null indicator by default such that data (0,0) does not appear in the matrix 800. In such an embodiment, the matrix 800 may include 3 different values: (1,1), meaning that the user has been presented with the media item and has selected the media item; (1,0), meaning that the user has been presented with the media item and has not selected the media item; and null, meaning that the user has not been presented with the media item. In some embodiments, values associated with the indications of whether a media item has been presented or played may be greater than 1. For example, the values may indicate the number of times the media items has been presented to and/or played by the user.

The presentation engine 340 of the server 300 of FIG. 3 may be able to model take-rate probabilities for users based on the sparse matrix 800. In other embodiments, the presentation engine 340 may be configured to model take-rate probabilities and/or user preferences based on complete matrices only.

Referring now to FIG. 8B, shown therein is a matrix 850 that includes artificial user activity data wherever (0,0) or null is present in the matrix 800. Accordingly, the matrix 850 may be derived from the matrix 800, but further includes the artificial user activity data. As shown in the matrix 800 and matrix 850, the user 1A2B has been presented and has selected the media items 1533 and 4823, corresponding to "Fast and Ferocious I" and "Fast and Ferocious II" shown in the first media item catalog 500 of FIG. 5A. The presentation engine 340 may include models that show that users that have been presented and watched the media item 1533 ("Fast and Ferocious I") have a certain probability of watching the media item 4823 when presented with it. When the probability is above a threshold (e.g., 1%, 5%, 20%, etc.), an artificial play record may be generated by the presentation engine 340 and included in the matrix 850. This artificial play record may be referred to as a generated play record, and the server 300 may generate a play record for some or all (0,0)'s or nulls present in the matrix 800. In FIG. 8B, a plurality of generated play records are indicated in the indices $m_{1,4}$, $m_{2,2}$, $m_{3,4}$, $m_{4,4}$, and $m_{4,3}$ as having an asterisk by the generated play record. No generated play record is included in the matrix 850 for $m_{3,5}$, in the illustrated embodiment. However, in practice, the matrix 850 may include no way of distinguishing between artificial user activity data and real user activity data. After the artificial user activity data has been included in the matrix 850, the matrix 850 may be provided to the presentation engine 340 for the generation of user recommendations based upon one or more models.

Referring now to FIGS. 9A-D, shown therein are exemplary graphical models or plate notation models that may be employed by the presentation engine 340, specifically, or more generally by the server 300, in generating recommendations for users of the streaming media system. The model 900 of FIG. 9A implements personalized rankings of media items that may be used to provide recommendations to a user via a discrete mixture across users of take-rates across media items. The users play behavior is modeled by identifying a user cluster and then observing take-rate information from user activity data as illustrated in matrix 800 of FIG. 8A or matrix 850 of FIG. 8B. The user's predicted play behavior (e.g., the probability that the user will select a particular media item when presented with that media item) is modeled according to the cluster to which the user belongs. Within a cluster, each take-rate expresses a Bernoulli probability that a user in the cluster will play a particular media item or otherwise select the media item when presented with the media item, such as in the user interface 406 of FIG. 4. The model 900 determines the probability that a user will select a media item based on the cluster that the user belongs to and the media item itself according to equation (1) below:

$$p(x_{1:N}, z_{1:n} \mid t_{1:n}) = \prod_{d=1}^{D} p(z_d) \left( \prod_{n=1}^{N_d} p(x_{d,n} \mid z_d, t_{d,n}) \right) \quad \text{Equation (1)}$$

In equation (1), D is the number of users, such that d is a particular user, z is the cluster to which the user belongs (in the model 900, the user may only belong to one cluster), N is presentation and/or play data such as the portion of user activity data in the matrix 800 or 850 indicating whether or not each media item has been played by the user (e.g., as a 1 if played and a 0 if not played), t is the media item or "title" associated with a play, x is observed data indicating whether or not the user played each media item. θ may be estimates from a learning algorithm defined by the model. θ may indicate the probability that a particular user belongs to a particular cluster. φ may be a matrix having a row for every cluster and a column for each media item. At each index within φ, there is a probability indicating the likelihood that, given the particular cluster, a media item presented to the users associated with that cluster will be played. The learning algorithm may find both θ and φ.

Because model 900 assumes that a user is associated with or belongs to only one cluster, all of the activity data from that user will be associated with that particular cluster in proportion to the probability that that user belongs to that particular cluster. If there is a 20% chance that a user belongs to a particular cluster, 20% of the activity data associated with that user will be associated with the particular cluster. Each cluster may be associated with this collection of probabilities, which may be Bernoulli random variables.

In model 900, each media item is effectively modeled as a complete catalog, which contains only that media item. The model determines the probability that the media item in that catalog, referred to as a singleton catalog because the modeled catalog contains only one media item, will be played when presented to a specific user. A likelihood function may be obtained from the equation (1) by marginalizing the joint distribution over z (all latent variables included in the model 900). The model is then parameterized. In the model 900, when a media item has been presented to a user once, subsequent presentations may be ignored so that each media item may only appear once or not at all in a sequence for each user. The data may be fitted by any of several approaches. For example, an expectation-maximization (EM) algorithm, a Gibbs algorithm, a Kalman filter, or a hidden Markov model may be used to fit the data to provide recommendations for a user.

Figure 9D:
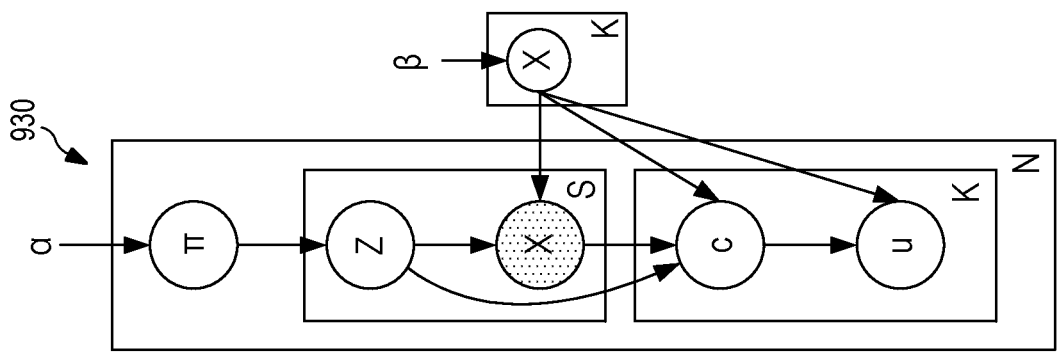
FIGS. 9A, 9B, 9C, and 9D are graphical models or plate notation models that may be employed to provide recommendations to users of the streaming media system according to some embodiments of the present disclosure.
Figure 9C:
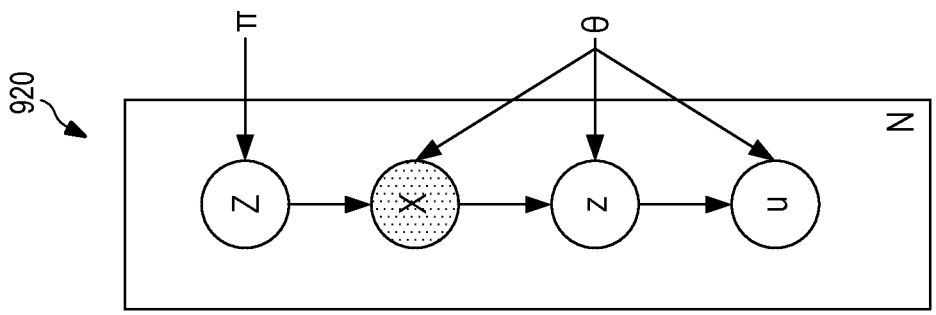
Figure 9B:
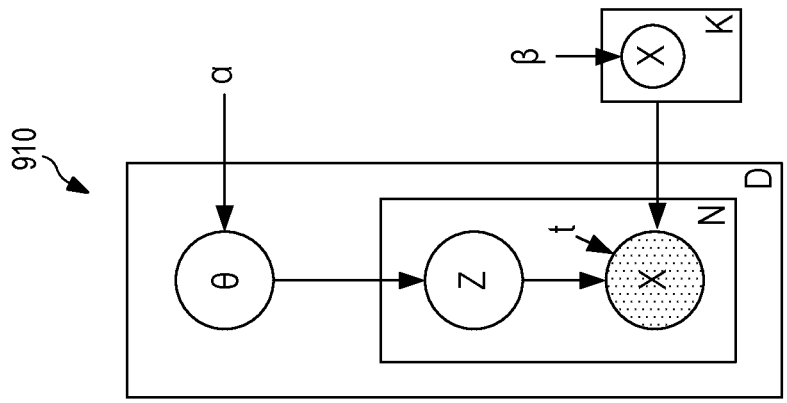
Figure 9A:
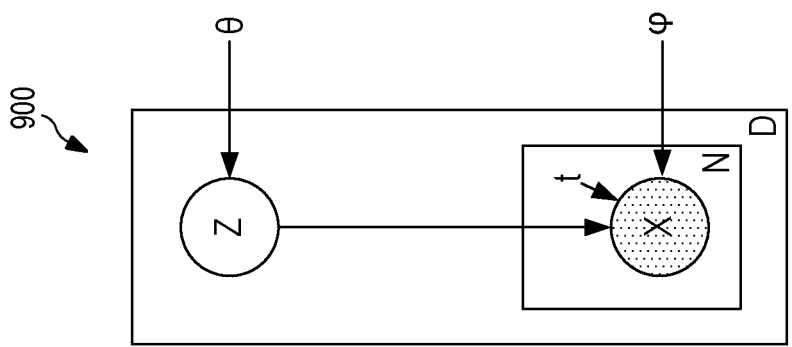

Referring now to model 910 of FIG. 9B, the model 910 is another model that may be employed by the server 300 of FIG. 3 in providing recommendations to users of the streaming media system. The model 910 provides a generalization of the model 900 similar to a latent Dirichlet allocation (LDA) in natural language processing. As shown in FIG. 9B, the model 910 has variables including, D which represents the total number of users of the media streaming system, θ which represents the mixture of clusters for a particular user, N which is the total number of presentation or play events, K is the number of clusters, Z which is the cluster to which a response to a presentation belongs, t is the media item, X indicates whether a media item was played or not, W corresponds to the number of unique media items presented to the user, φ represents the cluster matrix described above in connection with the model 900 of FIG. 9A and may describe parameters or the popularity of a media item, and α and β are tuning parameters. Model 910 may be described by equation (2) below:

$$p(x, z, \theta, \varphi \mid \alpha, \beta) = \left( \prod_{d=1}^{D} \frac{\Gamma(K\alpha)}{\Gamma(\alpha)^K} \prod_{k=1}^{K} \theta_{kj}^{N_{kj}+\alpha-1} \right) \quad \text{Equation (2)}$$

$$\left( \prod_{k=1}^{K} \prod_{w=1}^{W} \frac{\Gamma(K\beta)}{\Gamma(\beta)^2} \prod_{v=1}^{2} \varphi_{wk}^{N_{kvwk}+\beta-1} \right)$$

The resulting data from equation (2) may be fitted by any of several approaches. For example, a Gibbs algorithm, an expectation-maximization (EM) algorithm, a Kalman filter, or a hidden Markov model or another suitable approach may be used to fit the data to provide recommendations for a user. Modification of the model 910 may include leaving K, the number of clusters, undefined such that it may be infinite or that the model may provide a number mathematically derived from the user activity data. Such a modification to the model 910 results in a hierarchical Dirichlet process (HDP) model.

Models 920 and 930 of FIGS. 9C and 9D, respectively, provide truncated multinomial models. The approach provided by models 920 and 930 as they may be implemented by the server 300 and/or presentation engine 340 is to add, for each user, a collection of latent variables that model the user's response to media items that are not actually accessible to the user, as described herein in connection with FIGS. 5A and 5B, illustrating the overlapping media item catalogs 500 and 550, which included overlapping media items and exclusive media items. The models 920 and 930 estimate the popularity of each video in the entire catalog, given that fact that the entire catalog is not available to every user. As described herein, if only plays of media items are counted, the merited popularity of certain media items (those accessible to the more users) may not be accurately determined.

The truncated multinomial model 920 may be represented as seen in equation (3) below:

$$TM_j(x \mid n, \theta) = \frac{n!}{\prod_i x_i!} \prod_i \left(\frac{\theta_i}{1-\varphi}\right)^{x_i}, \varphi = \sum_{j \in J} \theta_j \quad \text{Equation (3)}$$

The plate model 920 includes N as the total number of users, z represents clusters with which each user may be associated, x observations of plays by the users, u represents the count of plays for the specific truncated or unobservable media items, and w is a latent variable representing the total number of each user's truncated or the sum of all u across missing media items, e.g. items not accessible to the user because they are not included in the catalog accessible to the user, for the subset of media items J that are not available to the user. The output of the model 920 may be similar to the matrix 850 which includes artificial user activity data where the matrix 800 included (0,0) or null. The output of the model 920 may then be used to determine which media items should be recommended to a particular user. The recommendation is based on an estimate of the popularity of exclusive media items among users that do not actually have access to those exclusive media items.

Referring now to the model 930 of FIG. 9D, the model 930 is also a truncated multinomial model, but is a latent Dirichlet allocation (LDA) truncated multinomial model. The model 930 shares many features in common with the model 920 and may also be represented by equation (3). However, the models 920 and 930 are parameterized differently according to the illustrated features of each plate model 920 and 930. The model 930 further includes a nested Gibbs sampler and includes additional variables, including c which is the count of hidden plays (e.g., generated play records), s represents the observations of the number of plays of the user on the catalog available to the user, and π is the association of each user across existing clusters. Again, α and β are tuning parameters. α represents sparsity and controls how smooth the user distribution would be across multiple clusters. The Gibbs sampler collapses out the count c and the identity u of hidden media items.

Any of the models 900, 910, 920, or 930 may be employed by the presentation engine 340 executing on the processor 302 of the server 300 to provide recommendations to users that compensate for the differences in sizes of overlapping but not identical media item catalogs in different jurisdictions and that compensate for the effects of providing recommendations to the users. In this way, data from a global streaming media system may be processed by a central processor and remain useful in each jurisdiction for providing recommendations. The models 900, 910, 920, and/or 930 may be applied to solve a problem particular to Internet-based media distribution systems, such as the streaming media system 100 illustrated in FIG. 1.

Figure 10:
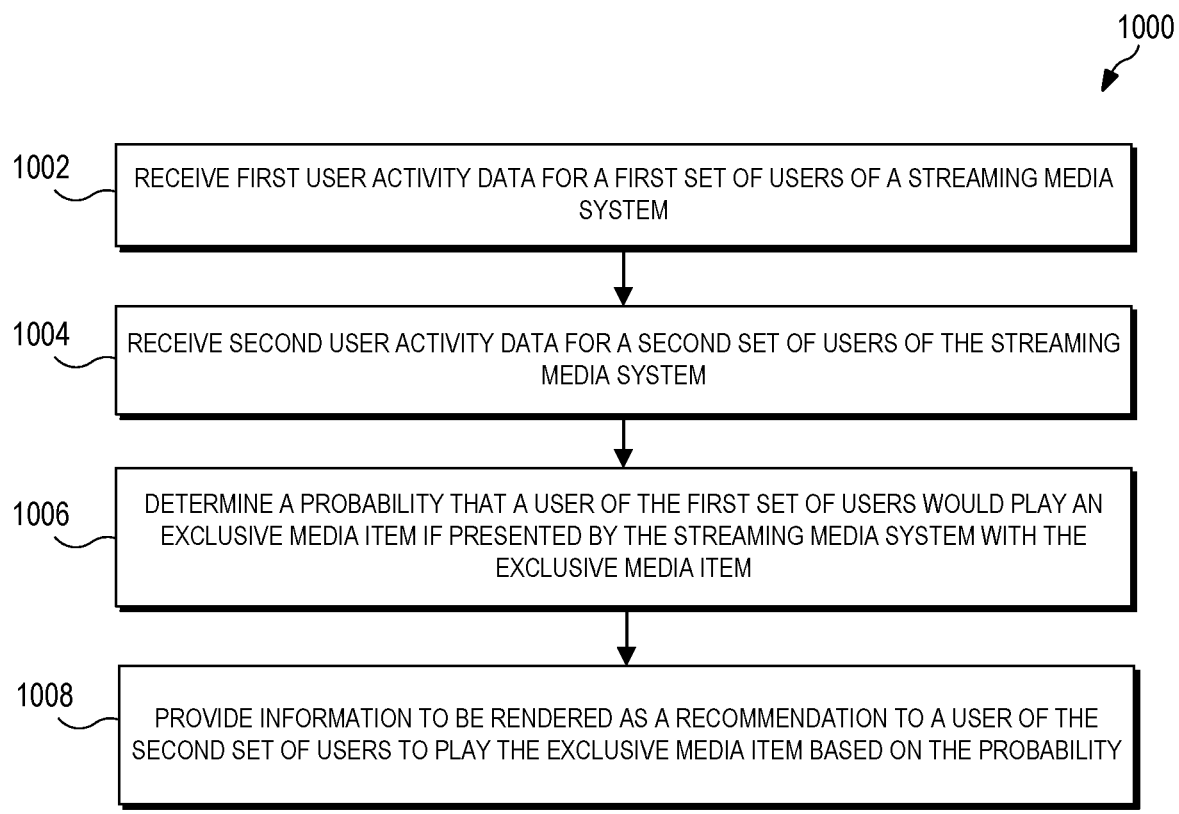
FIG. 10 is a flowchart illustrating a method of providing recommendations to users of a streaming media system according to some embodiments.

Referring now the FIG. 10, shown therein is a flowchart of a method 1000 of providing recommendations to a user of a streaming media items, like the streaming media system 100 of FIG. 1. As illustrated in FIG. 10, the method 1000 includes several enumerated steps or operations. Embodiments of method 1000 may include additional steps or operations before, after, in between, or as part of the enumerated operations. Some or all of the operations may be embodied in a set of computer-readable instructions. These computer-readable instructions may be stored in the memory 304 of the server 300 and executed by the processor 302 to provide the presentation engine 340 as described herein.

As illustrated in FIG. 10, the method 1000 may begin at step 1002 in which a processing device, such as the processor 302 of server 300, receives first user activity data for a first set of users of a streaming media system. The first set of users have access to a first media item catalog, such as the first media item catalog 500 of FIG. 5A. At step 1004, the processing device receives second user activity data for a second set of users of the streaming media system. The second set of users has access to a second media item catalog and not having access to the first media item catalog. For example, the second set of users may reside in a jurisdiction that is permitted by the streaming media server 110 or 300 to access the second media item catalog 550 of FIG. 5B; while the first set of users reside in a jurisdiction that is able to access the first media item catalog 500. The second media item catalog includes media items that are also included in the first media item catalog, and further includes at least one exclusive media item that is not included in the first media item catalog. The exclusive media item may be exclusive to the second media item catalog due to licensing restrictions imposed on the operator of the streaming media system.

The first and second user activity data may include information such as the user-cluster table 600, the user-catalog table 700, and the matrix 800 of FIGS. 6, 7, and 8A, respectively. Thus, the user activity data may include information for each media item in each catalog and for each user that indicates whether the user has been presented with the media item and whether the user has selected the media item for play after being presented therewith.

At step 1006, the processing device determines, based on the first and second user activity data, a probability that a user of the first set of users would play the exclusive media item if presented by the streaming media system with the exclusive media item. For example, the presentation engine 340 may determine based on information in the matrix 800 or the matrix 850 a probability that the user would play the exclusive media item if it were available to the user and presented to the user, e.g., as a recommendation in the user interface 406 or another comparable interface.

At step 1008, the processing device provides information to be rendered in a user interface by a user device as a recommendation to a user of the second set of users to play the exclusive media item based on the probability. For example, the exclusive media item may be recommended to the user by including the media item in a list or grouping of media items for the user in the user interface 406 on the touchscreen 402 of the mobile client device 400.

In some embodiments, the processing device further determines an inter-catalog or cross-catalog ranking of media items, which comprises a ranking of media items included in the first and second media item catalogs. Thus, the ranking may include rankings of overlapping media items and exclusive media items. As described herein an exclusive media item may be a media item that appears in only one media item catalog or the exclusive media item may be a media item that appears in all media item catalogs of the streaming media system except one.

The processing device may further identify a user cluster with which the user of the second set of users is associated or a user cluster for each user of the media streaming system, determine popular media items from that first and second media item catalogs, and determine that the exclusive media item is accessible to the user of the second set of users. The popular media items may be defined, in some embodiments, as media items having a take-rate ranking above a threshold value among users in the user cluster, among users having access to a particular media item catalog, or among all users of the media streaming system. The popular media items may include the exclusive media item. For example, the media items in the first and second media item catalogs may be ranked according to how often users of the streaming media system play the media items when presented with the media items.

The processing device may consolidate the first and second user activity into a consolidated user activity data set that includes, for each media item and each user, an indication of whether the media item has been presented to the user and an indication of whether the media item has been selected by the user.

Embodiments of the method 1000 may further include a step in which the processing device generates artificial user activity data based on the probability that the user of the first set of users would play the exclusive media item if presented with the exclusive media item. In such embodiments, the information to be rendered as a recommendation to the user of the second set of users may be based on the first and second user activity data and the artificial user activity data.

Figure 11:
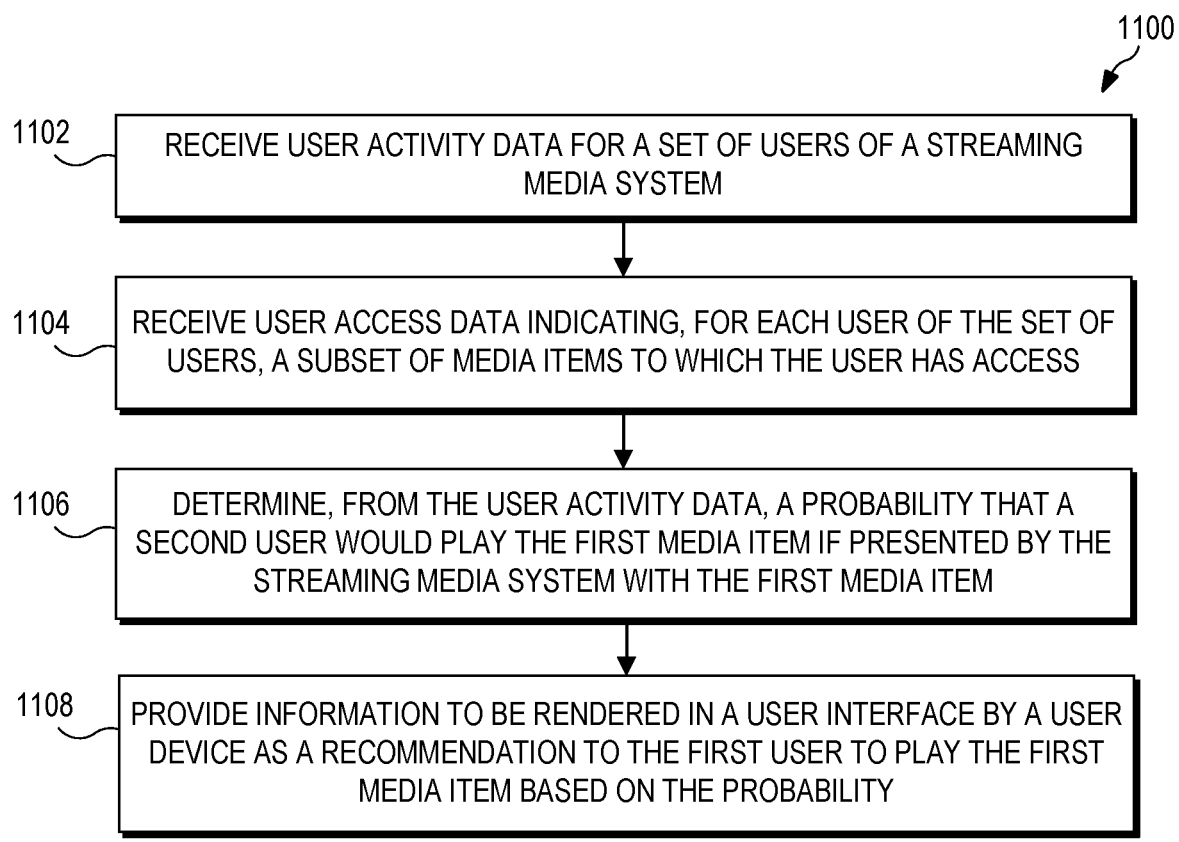
FIG. 11 is a flowchart illustrating another method of providing recommendations to users of the streaming media system according to some embodiments.

Referring now to FIG. 11, shown therein is an embodiment of a method 1100 for providing recommendations to a user of a streaming media system that includes multiple overlapping but distinct media item catalogs. Like the method 1000, the method 1100 may be embodied in a non-transitory, machine-readable medium as a set of instructions or executable code. Executable code may be executed by the processor 302 of the server 300 or by the server 110 to provide recommendations to users of the streaming media system.

As illustrated in FIG. 11, the illustrated embodiment of the method 1100 begins at step 1102 in which a processing device receives user activity data for a set of users of a streaming media system. The user activity data may describe interactions of the users with one or more of a set of media items in a media item catalog. The interactions may include presentations by the streaming media system to the user, e.g., as a recommendation, and may include selections of a user with respect to one or more media items in the media item catalog. Selections of a media item by a user may include requests to play the media item, requests for additional information regarding the media item, ratings of the media item, etc.

At step 1104, the processing device may receive user access data that indicates, for each user of the set of users, a subset of media items to which the user has access. The access data may include information like that presented in the user-catalog table 700 of FIG. 7, which indicates which media item catalog of a streaming media system may be accessed by any given user of the streaming media system. A first user of the set of users may access to a first media item to which a second user of the set of users does not have access. For example, the first user may have access to the first media item catalog 500 of FIG. 5B which includes the media item 4823 while a second user may have access to the second media item catalog 550 of FIG. 5B which does not include the media item 4823.

At step 1106, the processing device determines, from the user activity data, a probability that a second user would play the first media item if presented by the streaming media system with the first media item. And step 1108, the processing device provides information to be rendered in a user interface by a user device as a recommendation to the first user to play the first media item based on the probability.

In some embodiments of the method 1100, the processing device may be used to generate artificial user activity data that includes one or more generated play record based on the probability that the second user would play the first media item if presented with the first media item. For example, the processing device may generate artificial play records to complete the matrix 850 of FIG. 8B. In some embodiments, a subset of the media items in the media catalog are associated with a particular cluster of users that includes both the first user and the second user based on user activity data of the first user and user activity data of the second user. The recommendation to the first user may be further based on the association of the first user with the particular cluster of users. In some embodiments, the processing device may associate the first user with a particular cluster based in part on artificial user activity such as a generated play record that estimates how the first user would respond if presented with a media item associated with particular cluster to which the first user does not have access.

Embodiments of the presently disclosed systems and methods described herein permit a media system, whether a download-based media system or a streaming media system, to provide recommendations to users that have access to different media item catalogs that include some overlapping media items. The problems overcome by the systems and methods described herein are unique to Internet-based systems of media distribution and particularly to those media distribution systems that have different media item catalogs accessible to different users. More particularly, the systems and methods described herein may improve centralized recommendations for media systems that having customers or users that reside in different jurisdictions, such that the different media item content may be licensed for different jurisdictions separately. The systems and methods described herein facilitate improved recommendations for media systems having overlapping media item catalogs that result pay-walls or tiered subscription fees. Certain aspects of the present disclosure are set out the following numbered clauses:

1. A computer-implemented method, the method comprising: receiving first user activity data for a first set of users of a streaming media system, the first set of users having access to a first media item catalog; receiving second user activity data for a second set of users of the streaming media system, the second set of users having access to a second media item catalog and not having access to the first media item catalog, wherein the second media item catalog includes overlapping media items, the overlapping media items being included in both the first and second media item catalogs, the second media item catalog further includes an exclusive media item that is not included in the first media item catalog; determining, by a processing device and based on the first and second user activity data, a probability that a user of the first set of users would play the exclusive media item if presented by the streaming media system with the exclusive media item; and providing information to be rendered in a user interface by a user device as a recommendation to a user of the second set of users to play the exclusive media item based on the probability.

2. The method of clause 1, further comprising determining an inter-catalog ranking of media items, the inter-catalog ranking comprising a ranking of media items included in the first and second media item catalogs.

3. The method of any of clauses 1-2, further comprising: identifying a user cluster with which the user of the second set of users is associated; determining popular media items from that first and second media item catalogs, the popular media items having a ranking above a threshold value among users in the user cluster, the popular media items comprising the exclusive media item; and determining that the exclusive media item is accessible to the user of the second set of users.

4. The method of any of clauses 1-3, wherein the media items in the first and second media item catalogs are ranked according to how often users of the streaming media system play the media items when presented with the media items.

5. The method of any of clauses 1-4, wherein the first and second user activity data are consolidated in a consolidated user activity data set, and wherein the consolidated user activity data set comprises, for each media item and each user, an indication of whether the media item has been presented to the user and an indication of whether the media item has been selected by the user.

6. The method of any of clauses 1-5, wherein the media item being presented to the user comprises recommending the media item to a user through the user interface.

7. The method of any of clauses 1-6, further comprising generating artificial user activity data based on the probability that the user of the first set of users would play the exclusive media item if presented with the exclusive media item, and wherein the information to be rendered as a recommendation to the user of the second set of users is based on the first and second user activity data and the artificial user activity data.

8. The method of any of clauses 1-7, wherein the first set of users reside in a first legal jurisdiction and the second set of users reside in a second legal jurisdiction and wherein the first catalog is available in the first legal jurisdiction and the second catalog is available in the second legal jurisdiction.

8.1 A non-transitory computer-readable storage medium storing instructions that, when executed by one or more processing devices, cause the processing devices to perform any of the features recited in any of clauses 1-8.

8.2. A computer program product including instructions that, when implemented on one or more processing devices, carries out any of the features recited in any of clauses 1-8.

8.3. A computing system that, when implemented by one or more processing devices, performs operations providing any of the features recited in any of clauses 1-8.

9. A system for providing streaming media items to users, the system comprising: a data storage device, the data storage device storing: first user activity data for a first set of users of a streaming media system, the first set of users having access to a first media item catalog; and second user activity data for a second set of users of the streaming media system, the second set of users having access to a second media item catalog and not having access to the first media item catalog, wherein the second media item catalog includes overlapping media items that are included in both the first and second media item catalogs, the second media item catalog further includes an exclusive media item that is not included in the first media item catalog; and a processing device in communication with the data storage device to access information about contents of the first and second media item catalogs and the first and second user activity data, wherein the processing device: determines, from the first and second user activity data, a probability that a user of the first set of users would play the exclusive media item if presented by the streaming media system with the exclusive media item; and provides information to be rendered in a user interface by a user device as a recommendation to a user of the second set of users to play the exclusive media item based on the probability.

10. The system of clause 9, wherein the first and second user activity data stored in the data storage is combined in a consolidated user activity data set, and wherein the consolidated user activity data set comprises, for each media item and each user, an indication of whether the media item has been presented to the user and an indication of whether the media item has been played by the user.

11. The system any of clauses 9-10, wherein the processing device determines an inter-catalog ranking of media items, the inter-catalog ranking comprising a ranking of media items included in the first and second media item catalogs.

12. The system any of clauses 9-11, wherein the user of the first set of users and the user of the second set of users are both associated with a first cluster of users, and wherein first set of users is additionally associated with a second cluster of users, such that the first user can be defined by association with the first cluster and second cluster.

13. The system any of clauses 9-12, wherein the probability associated with each media item is a Bernoulli random variable.

14. The system any of clauses 9-13, wherein the first and second media item catalogs are not separated by a pay-wall.

14.1 A non-transitory computer-readable storage medium storing instructions that, when executed by one or more processing devices, cause the processing devices to perform any of the features recited in any of clauses 9-14.

14.2. A computer program product including instructions that, when implemented on one or more processing devices, carries out any of the features recited in any of clauses 9-14.

14.3. A method that, when implemented by one or more processing devices, performs operations providing any of the features recited in any of clauses 9-14.

15. A system for providing streaming media items to users, the system comprising: a data storage device storing, the data storage device storing: user activity data for a set of users of a streaming media system, the user activity data describing interactions of the users with one or more of a set of media items in a media item catalog; user access data indicating, for each user of the set of users, a subset of media items to which the user has access, wherein a first user of the set of users has access to a first media item to which a second user of the set of users does not have access; and a processing device in communication with the data storage device to access information about the set of media items, the user activity data, and the user access data wherein the processing device: determines, from the user activity data, a probability that the second user would play the first media item if presented by the streaming media system with the first media item; and provides information to be rendered in a user interface by a user device as a recommendation to the first user to play the first media item based on the probability.

16. The system of clause 15, wherein the user access data comprises an indication of which media items in the media item catalog each user of the set of users is able to access.

17. The system any of clauses 15-16, further comprising artificial user activity data, wherein the artificial user activity data comprises a generated play record based on the probability that the second user would play the first media item if presented with the first media item.

18. The system any of clauses 15-17, wherein a subset of the media items in the media catalog are associated with a cluster of users that includes both the first user and the second user based on user activity data of the first user and user activity data of the second user.

19. The system any of clauses 15-18, wherein the recommendation to the first user is further based on the association of the first user with the cluster of users.

20. The system any of clauses 15-19, wherein media items are associated with the cluster based on the user activity data of the first user and the second user and based on artificial user activity data that comprises a generated play record based on the probability that the second user would play the first media item if presented with the first media item.

20.1 A non-transitory computer-readable storage medium storing instructions that, when executed by one or more processing devices, cause the processing devices to perform any of the features recited in any of clauses 15-20.

20.2. A computer program product including instructions that, when implemented on one or more processing devices, carries out any of the features recited in any of clauses 15-20.

20.3. A method that, when implemented by one or more processing devices, performs operations providing any of the features recited in any of clauses 15-20.

Although the foregoing aspects of the present disclosure have been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A computer-implemented method, the method comprising:
receiving first user activity data for a first set of users of a streaming media system, the first set of users having access to a first media item catalog;
receiving second user activity data for a second set of users of the streaming media system, the second set of users having access to a second media item catalog and not having access to one or more media items in the first media item catalog, wherein the second media item catalog includes overlapping media items, the overlapping media items being included in both the first and second media item catalogs, the second media item catalog further includes an exclusive media item that is not included in the first media item catalog;
determining, by a processing device and based on the first and second user activity data, a probability that a user of the first set of users would play the exclusive media item if recommended by the streaming media system, wherein determining the probability of the user playing the exclusive media item includes:
compensating, in the determination, for one or more biasing effects introduced by recommending the exclusive media item, the compensating being based on take-rate information included in the first and second user activity data indicating which users selected the exclusive media item; and
compensating, in the determination, for one or more biasing effects introduced by size differences in overlapping but non-identical media item catalogs in different geographical jurisdictions by analyzing the take-rate information to determine whether the number of times the exclusive media item was selected is proportionate between the different geographical jurisdictions; and
providing information to be rendered in a user interface by a user device as a recommendation to a user of the second set of users to play the exclusive media item based on the probability.

2. The method of claim 1, further comprising determining an inter-catalog ranking of media items, the inter-catalog ranking comprising a ranking of media items included in the first and second media item catalogs.

3. The method of claim 1, further comprising:
identifying a user cluster with which the user of the second set of users is associated;
determining popular media items from that first and second media item catalogs, the popular media items having a ranking above a threshold value among users in the user cluster, the popular media items comprising the exclusive media item; and determining that the exclusive media item is accessible to the user of the second set of users.

4. The method of claim 1, wherein the media items in the first and second media item catalogs are ranked according to how often users of the streaming media system play the media items when presented with the media items.

5. The method of claim 1, wherein the first and second user activity data are consolidated in a consolidated user activity data set, and wherein the consolidated user activity data set comprises, for each media item and each user, an indication of whether the media item has been presented to the user and an indication of whether the media item has been selected by the user.

6. The method of claim 5, wherein the media item being presented to the user comprises recommending the media item to a user through the user interface.

7. The method of claim 1, further comprising generating artificial user activity data based on the probability that the user of the first set of users would play the exclusive media item if presented with the exclusive media item, and wherein the information to be rendered as a recommendation to the user of the second set of users is based on the first and second user activity data and the artificial user activity data.

8. The method of claim 1, wherein the first set of users reside in a first legal jurisdiction and the second set of users reside in a second legal jurisdiction and wherein the first catalog is available in the first legal jurisdiction and the second catalog is available in the second legal jurisdiction.

9. A system for providing streaming media items to users, the system comprising: a data storage device, the data storage device storing:
  first user activity data for a first set of users of a streaming media system, the first set of users having access to a first media item catalog; and
  second user activity data for a second set of users of the streaming media system, the second set of users having access to a second media item catalog and not having access to one or more media items in the first media item catalog, wherein the second media item catalog includes overlapping media items that are included in both the first and second media item catalogs, the second media item catalog further includes an exclusive media item that is not included in the first media item catalog; and
  a processing device in communication with the data storage device to access information about contents of the first and second media item catalogs and the first and second user activity data, wherein the processing device:
  determines, from the first and second user activity data, a probability that a user of the first set of users would play the exclusive media item if recommended by the streaming media system, wherein determining the probability of the user playing the exclusive media item includes:
    compensating, in the determination, for one or more biasing effects introduced by recommending the exclusive media item, the compensating being based on take-rate information included in the first and second user activity data indicating which users selected the exclusive media item; and
    compensating, in the determination, for one or more biasing effects introduced by size differences in overlapping but non-identical media item catalogs in different geographical jurisdictions by analyzing the take-rate information to determine whether the number of times the exclusive media item was selected is proportionate between the different geographical jurisdictions; and
  provides information to be rendered in a user interface by a user device as a recommendation to a user of the second set of users to play the exclusive media item based on the probability.

10. The system of claim 9, wherein the first and second user activity data stored in the data storage is combined in a consolidated user activity data set, and wherein the consolidated user activity data set comprises, for each media item and each user, an indication of whether the media item has been presented to the user and an indication of whether the media item has been played by the user.

11. The system of claim 9, wherein the processing device determines an inter-catalog ranking of media items, the inter-catalog ranking comprising a ranking of media items included in the first and second media item catalogs.

12. The system of claim 11, wherein the user of the first set of users and the user of the second set of users are both associated with a first cluster of users, and wherein first set of users is additionally associated with a second cluster of users, such that the first user can be defined by association with the first cluster and second cluster.

13. The system of claim 12, wherein the probability associated with each media item is a Bernoulli random variable.

14. The system of claim 9, wherein the first and second media item catalogs are not separated by a pay-wall.

15. A system for providing streaming media items to users, the system comprising:
  a data storage device storing, the data storage device storing:
    user activity data for a set of users of a streaming media system, the user activity data describing interactions of the users with one or more of a set of media items in a media item catalog;
    user access data indicating, for each user of the set of users, a subset of media items to which the user has access, wherein a first user of the set of users has access to a first media item to which a second user of the set of users does not have access; and
  a processing device in communication with the data storage device to access information about the set of media items, the user activity data, and the user access data wherein the processing device:
    determines, from the user activity data, a probability that the second user would play the first media item if recommended by the streaming media system, wherein determining the probability of the user playing the exclusive media item includes:
      compensating, in the determination, for one or more biasing effects introduced by recommending the exclusive media item, the compensating being based on take-rate information included in the first and second user activity data indicating which users selected the exclusive media item; and
      compensating, in the determination, for one or more biasing effects introduced by size differences in overlapping but non-identical media item catalogs in different geographical jurisdictions by analyzing the take-rate information to determine whether the number of times the exclusive media item was selected is proportionate between the different geographical jurisdictions; and
    provides information to be rendered in a user interface by a user device as a recommendation to the first user to play the first media item based on the probability.

16. The system of claim 15, wherein the user access data comprises an indication of which media items in the media item catalog each user of the set of users is able to access.

17. The system of claim 15, further comprising artificial user activity data, wherein the artificial user activity data comprises a generated play record based on the probability that the second user would play the first media item if presented with the first media item.

18. The system of claim 15, wherein a subset of the media items in the media catalog are associated with a cluster of users that includes both the first user and the second user based on user activity data of the first user and user activity data of the second user.

19. The system of claim 18, wherein the recommendation to the first user is further based on an association of the first user with the cluster of users.

20. The system of claim 18, wherein media items are associated with the cluster based on the user activity data of the first user and the second user and based on artificial user activity data that comprises a generated play record based on the probability that the second user would play the first media item if presented with the first media item.

* * * * *